(12) United States Patent
Schoenbeck

(10) Patent No.: US 8,562,783 B2
(45) Date of Patent: Oct. 22, 2013

(54) METHOD FOR THE PRODUCTION OF AN ELASTIC LAMINATE MATERIAL WEB

(75) Inventor: Marcus Schoenbeck, Gronau (DE)

(73) Assignee: Mondi Gronau GmbH, Gronau (DE)

( * ) Notice: Subject to any disclaimer, the term of this patent is extended or adjusted under 35 U.S.C. 154(b) by 589 days.

(21) Appl. No.: 11/152,425

(22) Filed: Jun. 14, 2005

(65) Prior Publication Data
US 2006/0225835 A1    Oct. 12, 2006

(30) Foreign Application Priority Data
Apr. 11, 2005  (EP) .................................. 05007885

(51) Int. Cl.
*B32B 37/24*   (2006.01)
(52) U.S. Cl.
USPC ................. 156/276; 156/244.11; 156/289
(58) Field of Classification Search
USPC ............................ 156/244, 244.11, 276, 327
See application file for complete search history.

(56) References Cited

U.S. PATENT DOCUMENTS

| | | | | |
|---|---|---|---|---|
| 3,218,185 A | * | 11/1965 | Letteron | 442/73 |
| 3,592,725 A | * | 7/1971 | Yoshimura et al. | 428/146 |
| 4,521,479 A | * | 6/1985 | Maglio et al. | 428/326 |
| 5,139,841 A | * | 8/1992 | Makoui et al. | 428/109 |
| 5,389,168 A | * | 2/1995 | Litchholt et al. | 156/77 |
| 5,529,827 A | * | 6/1996 | Nakamura | 428/143 |
| 6,159,584 A | | 12/2000 | Eaton et al. | |
| 6,818,093 B1 | * | 11/2004 | Taal et al. | 156/327 |
| 2002/0058917 A1 | * | 5/2002 | Hisanaka et al. | 604/385.01 |
| 2005/0106980 A1 | * | 5/2005 | Abed et al. | 442/395 |

\* cited by examiner

*Primary Examiner* — William Bell
(74) *Attorney, Agent, or Firm* — Collard & Roe, P.C.

(57) ABSTRACT

A method for the production of an elastic laminate material web comprises laminating a cover material onto a carrier film consisting of a thermoplastic elastomer, using a hot-melt glue. The carrier film is rolled off a film roll and has a polymer powder on at least one side, to prevent interlocking of the layers of the carrier film in the film roll. The melt temperature of the powder is less than or equal to the gluing temperature of the hot-melt glue, so that the powder melts during lamination.

10 Claims, 3 Drawing Sheets

Fig.2
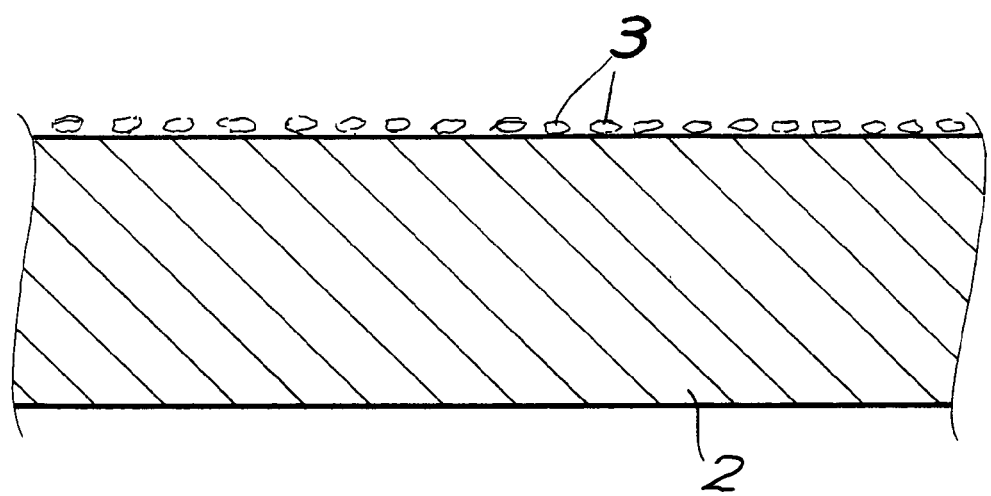
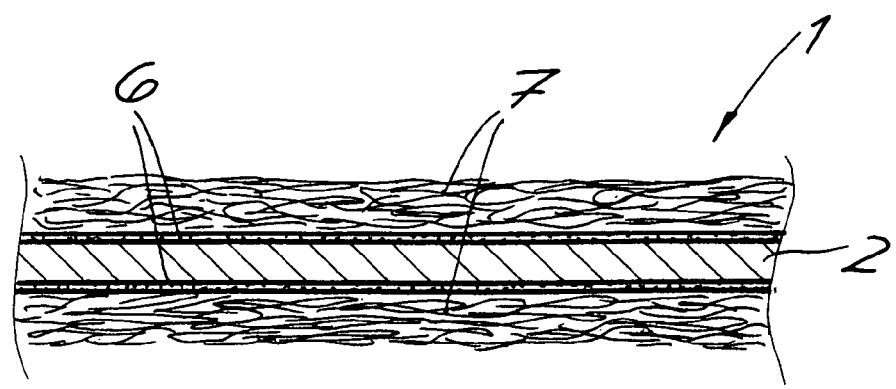
Fig.3

METHOD FOR THE PRODUCTION OF AN ELASTIC LAMINATE MATERIAL WEB

CROSS REFERENCE TO RELATED APPLICATIONS

Applicant claims priority under 35 U.S.C. §119 of European Application No. 05 007 885.6 filed Apr. 11, 2005.

BACKGROUND OF THE INVENTION

1. Field of the Invention

The invention relates to a method for the production of an elastic laminate material web, in which a cover material is laminated onto a carrier film consisting of a thermoplastic elastomer, using a hot-melt glue.

2. The Prior Art

An elastic laminate material web can be used for the production of elastic segments on articles of clothing and hygiene articles, for example as an elastic closure strip for baby diapers.

U.S. Pat. No. 6,159,584 describes a stretchable, elastic strip, which is preferably used as a closure strip of a disposable diaper. The co-extruded carrier film, onto which a fiber non-woven fabric is laminated, has a core of a thermoplastic elastomer, by means of which the elastic properties of the strip are made possible. Preferred elastomers are styrene-isoprene-styrene block copolymers (SIS), styrene-butadiene-styrene block copolymers (SBS), or styrene-ethylene/butylene-styrene block copolymers (SEBS), which have tacky properties. In the case of the co-extruded film, the core is disposed between two outer layers of a non-adhesive thermoplastic polymer. Because of the non-adhesive properties of the outer layers of the co-extrusion film, interlocking of the carrier while it is being rolled onto a film roll is prevented.

To prevent interlocking of film rolls, the application of powder made of silicon dioxide, chalk, starch, or talcum as a spacer material between the layers of a film roll is known. These powder materials result in a clear reduction of the adhesion forces when gluing takes place with a hot-melt glue, and for this reason, an attempt is made to apply only just enough powder as is necessary to prevent interlocking. In addition, an attempt is also made to compensate the reduction in the adhesion force with a large amount of hot-melt glue, which is only possible within limits, and results in an increase in the production costs. In addition, when the amount of powder applied is minimized, influences such as the storage duration and storage temperature of the film rolls and the possible effect of external forces on the film roll must also be precisely considered.

SUMMARY OF THE INVENTION

It is therefore an object of the invention to provide a method in which high laminate strength is achieved when laminating a cover material onto a carrier film made of a thermoplastic elastomer, which has been rolled off a film roll, using a small amount of hot-melt glue.

It is another object of the invention to provide a method that is inexpensive and flexible in use.

This object is accomplished, according to the invention, with a method for producing a material web, wherein the carrier film processed from a film roll has a polymer powder on at least one side, which prevents interlocking of the layers of the carrier film in the film roll. The melt temperature of the powder is less than or equal to the adhesion temperature of the hot-melt glue, so that the powder melts during lamination.

The term "powder" refers to a fine-particle powder. The melted powder mixes into the hot-melt glue, and as a result, because of the small amount of the powder and the formation between molecular forces, the negative influence of the powder material on the laminate strength is slight.

The cover material can be laminated onto the carrier film on one or both sides. A textile material, preferably a fiber non-woven fabric or non-woven fiber material (nonwoven), may be used as the cover material. The nonwoven can have, for example, a weight per area unit between 20 and 35 $g/m^2$. Preferably, a mono-film produced by extrusion, from a polymer from the group of styrene-isoprene-styrene block copolymers (SIS), styrene-butadiene-styrene block copolymers (SBS), styrene-ethylene/butylene-styrene block copolymers (SEBS), polyurethanes, or ethylene copolymers is used as the carrier film. Carrier films having a thickness between 40 and 70 μm, which are produced using a flat film extrusion method, are suitable, to a particular degree.

A polymer powder that consists of a polyolefin, for example polyethylene or ethylene vinyl acetate (EVA), is suitable as a polymer powder that is preferably present on the carrier film at a weight per area unit of less than or equal to 1 $g/m^2$, to a particular degree. The polymer powder is applied to at least one side of the carrier film before it is rolled up and after it is produced. The amount of the powder applied can be reduced to the minimally required degree by vacuuming or brushing the carrier film off before it is rolled up. By vacuuming or brushing the carrier film off, powder is particularly removed that does not adhere directly to the tacky carrier film, for example if the powder is present in several layers. Vacuuming or brushing the carrier film off to reduce the amount of powder is also possible after it is unrolled and before lamination.

The cover material is laminated onto the carrier film using a hot-melt glue. In the case of typical gluing temperatures of 140 to 170° C, the powder melts and is distributed in the hot-melt glue. The gluing temperature should be selected as a function of the hot-melt glue and the melting temperature of the powder, and is not limited to the stated range, in general. Hot-melt glues from the group of SIS-based and SBS-based polymers are particularly suitable. The weight per area unit at which the hot-melt glue is applied to each side of the carrier film to which the cover material is laminated is selected as a function of the cover material being used, and preferably lies in a range between 7 and 20 $g/m^2$.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 2 shows a carrier film that has a polymer powder on one side;

FIG. 3 shows a representation of the layers of an elastic laminate film; and

DETAILED DESCRIPTION OF THE PREFERRED EMBODIMENT

Figure 1:
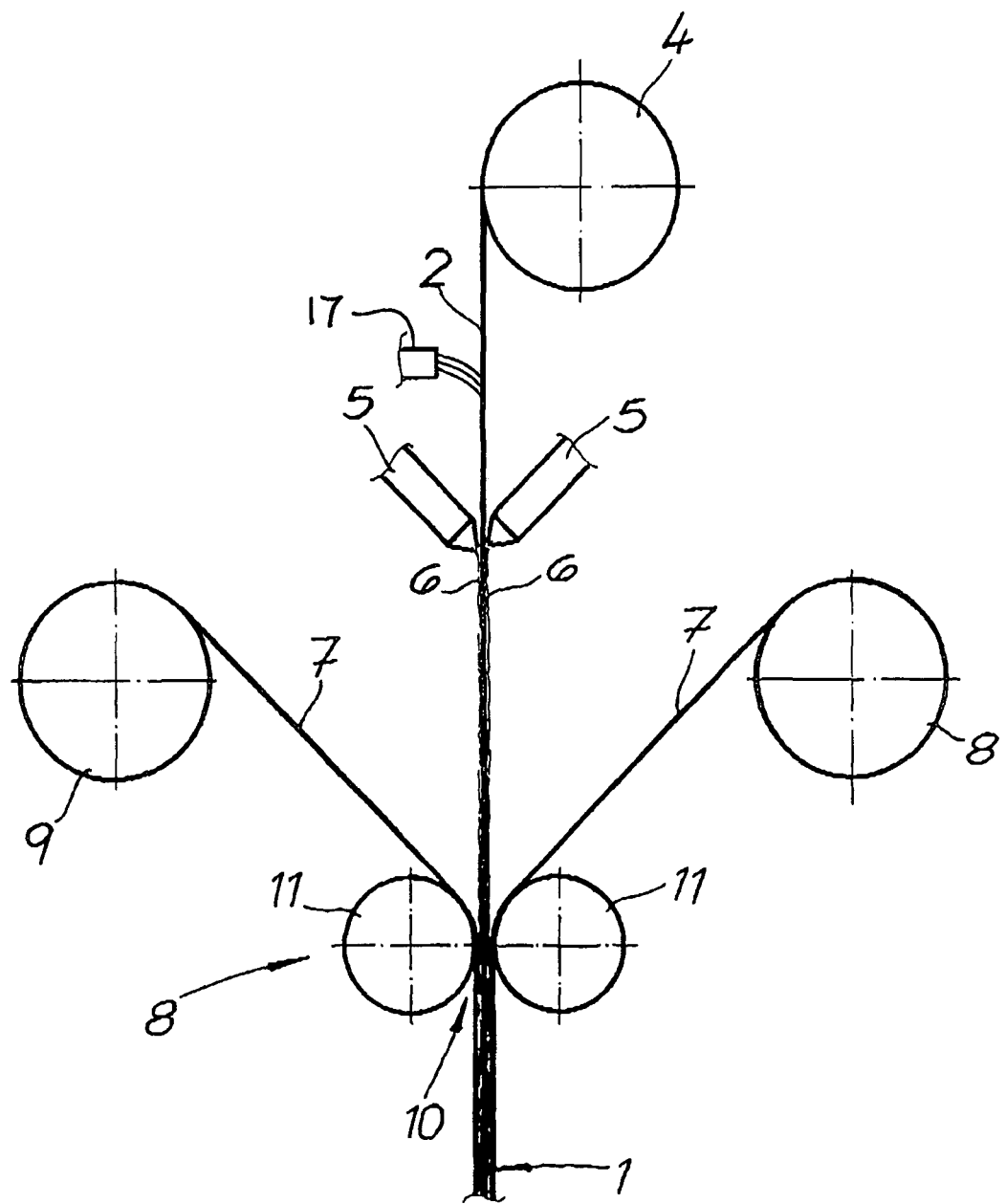
FIG. 1 shows a method for the production of an elastic laminate material web, in which a cover material is laminated onto a carrier film, using a hot-melt glue.

Referring now in detail to the drawings, FIG. 1 shows a method for the production of an elastic laminate material web 1. The carrier film 2, which has a polymer powder 3 on one side, is rolled off a film roll 4 and provided with a hot-melt glue 6 on both sides. Carrier film 2, in which melted powder 3 is mixed into the hot-melt glue 6, which preferably comes from a group of the SIS-based or SBS-based polymers, is passed to a laminating unit 8 together with two layers of a cover material 7. The cover material 7 consists of nonwoven, i.e. a fiber non-woven fabric. The webs of the fiber non-woven fabric are rolled off from rolls 9 and laminated onto carrier film 2 in a roller nip 10 between laminating rollers 11 of laminating unit 8.

In FIG. 2, carrier film 2 is shown before the lamination process. This is a mono-film produced by means of extrusion, from a polymer of the group of styrene-isoprene-styrene block copolymers (SIS), styrene-butadiene-styrene block copolymers (SBS), styrene-ethylene/butylene-styrene block copolymers (SEBS), polyurethanes, or ethylene copolymers. Carrier film 2, which typically has a thickness between 50 and 70 µm, is provided with polymer powder 3 on one side. Polymer powder 3, which preferably consists of a polyolefin on a polyethylene basis or, for example, also of ethylene vinyl acetate (EVA), has a low weight per area unit of less than or equal to 1 gm/m$^2$. This amount of powder is just sufficient to reliably prevent interlocking of the layers of carrier film 2 in film roll 4. Alternatively, excess powder may be brushed off via brush 17 prior to lamination, to achieve the desired weight per area unit of less than or equal to 1 g/m$^2$.

FIG. 3 shows a section through a laminate material web 1 produced according to the method according to the invention. Fiber non-woven fabric as cover material 7, which typically has a weight per area unit between 20 and 35 g/m$^2$, is laminated onto the carrier film 2 on both sides, using a hot-melt glue 6 that was applied to both sides of carrier film 2 at a weight per area unit between 7 and 20 g/m$^2$, in each instance. Polymer powder 3, which acts as a spacer in the storage of film roll 4, has completely melted and has distributed itself in hot-melt glue 6. Because of the small amount of powder, the negative effect on the laminate strength is minimal.

An incremental stretching of laminate material web 1 and/or the fiber non-woven fabric before lamination, or lamination of carrier film 2 in the form of strips of film that are spaced apart, can easily be carried out within the scope of the method according to the invention.

EXAMPLE 1

Figure 4:
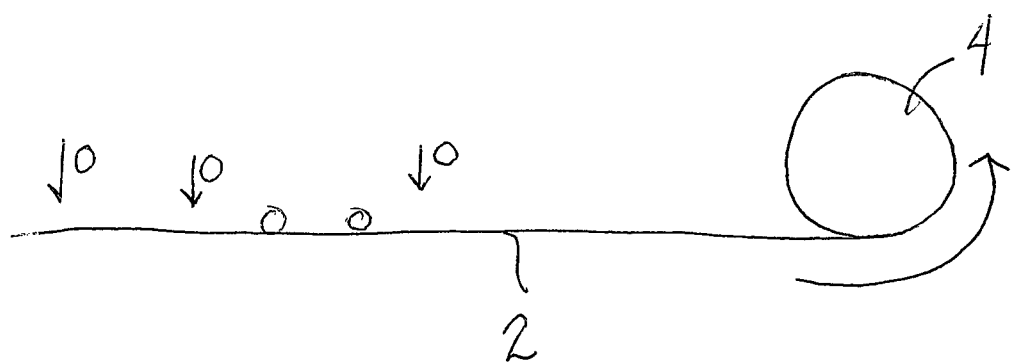
FIG. 4 shows the polymer powder being applied to the carrier film prior to rolling.

A carrier film 2 of SEBS is produced at a thickness of 50 µm, using a flat-film extrusion method. After extrusion, a polymer powder 3 of low-density polyethylene (LDPE) is applied to the carrier film 2 (as shown in FIG. 4) at an average weight per area unit of 1.5 g/m$^2$. Afterwards, that part of the powder 3 that does not adhere to the carrier film 2 is blown or brushed off from the latter, thereby reducing the weight per area unit of powder 3 on carrier film 2 to approximately 0.7 g/m$^2$. Carrier film 2 is wound up and can easily be stored and transported before further processing. During further processing, carrier film 2 is rolled off film roll 4 and provided with an SBS hot-melt glue on both sides. The SBS hot-melt glue is applied to both sides of carrier film 2 at a weight per unit area of 10 g/m$^2$, in each instance, at a temperature of 140° C. The powder 3 of LDPE melts at the gluing temperature and distributes itself in the SBS hot-melt glue. Subsequently, a fiber non-woven fabric having a weight per unit area of 20 g/m$^2$ is laminated onto carrier film 2 as a cover material 7.

EXAMPLE 2

A mono-film of SEBS is produced at a thickness of 70 µm, using a flat-film extrusion method. A powder 3 of EVA is sprinkled onto the extruded carrier film 2 at a weight per unit area of 0.8 g/m$^2$, and the latter is rolled up. The film roll 4 can be transported and stored before further processing. For further processing, carrier film 2 is rolled off film roll 4. After carrier film 2 has been rolled off, part of the powder is removed from carrier film 2 by means of a brushing process, before an SIS hot-melt glue having a melt temperature of 170° C. is applied to the carrier film on both sides, as a melted, viscous fluid. At the gluing temperature, the EVA powder melts and distributes itself in hot-melt glue 6, which is applied to both sides of the carrier film 2 at a weight per unit area of 15 g/m$^2$, in each instance. Subsequently, a fiber non-woven fabric having a weight per unit area of 35 g/m$^2$ is laminated onto both sides of carrier film 2 as cover material 7.

Accordingly, while only a few embodiments of the present invention have been shown and described, it is obvious that many changes and modifications may be made thereunto without departing from the spirit and scope of the invention.

What is claimed is:

1. In a process for the production of an elastic laminate material web, comprising the following steps:
   processing a carrier film made of a thermoplastic elastomer from a film roll;
   laminating a cover material on at least one side of the carrier film using a hot melt glue which is applied to the carrier film at a glue temperature;
   wherein the carrier film is a mono-film produced by extrusion from a polymer selected from the group consisting of styrene-isoprene-styrene block copolymer, styrene-butadiene-styrene block copolymer, styrene ethylene/butylene block copolymer, polyurethanes and ethylene copolymers,
   wherein the improvement comprises:
   applying a polymer powder directly to a surface of the carrier film on at least one side of the carrier film prior to the carrier film being rolled to prevent the carrier film from sticking to itself in the film roll,
   wherein the material in said film roll consists of said carrier film provided as a mono-film and said polymer powder, which acts as a spacer in the storaae of said film roll, and
   wherein the powder is present on the carrier film at a weight per area of less than or equal to 1 g/m$^2$,
   wherein the powder consists of a polyethylene or ethylene vinyl acetate having a melt temperature which is less than the glue temperature of the hot melt glue applied to the carrier film, so that the powder melts and mixes into the hot melt glue during the step of laminating.

2. A method according to claim 1, wherein the cover material is laminated onto the carrier film on both sides of the carrier film.

3. A method according to claim 1, wherein the cover material is a textile material.

4. A method according to claim 1, wherein the hot-melt glue is selected from the group of SIS-based and SBS-based polymers.

5. A method according to claim 1, wherein the hot-melt glue is applied to each side of the carrier film to which the cover material is laminated at a weight per area unit between 7 and 20 g/m$^2$.

6. A method according to claim 1, wherein a ratio of weight per area unit of the hot melt glue and the powder is at least 7:1.

7. In a process for the production of an elastic laminate material web, comprising the following steps:
processing a carrier film made of a thermoplastic elastomer from a film roll;
laminating a cover material on at least one side of the carrier film using a hot melt glue which is applied to the carrier film at a glue temperature;
wherein the carrier film is a mono-film produced by extrusion from a polymer selected from the group consisting of styrene-isoprene-styrene block copolymer, styrene-butadiene-styrene block copolymer, styrene ethylene/butylene-styrene block copolymer, polyurethanes and ethylene copolymers,
wherein the improvement comprises:
applying a polymer powder directly to a surface of the carrier film on at least one side of the carrier film prior the carrier film being rolled to prevent the carrier film from sticking to itself in the film roll, and
blowing or brushing off the surface of the carrier film after the film is unrolled and prior to laminating so that residual powder is present on the carrier film at a weight per area of less than or equal to 1 g/m$^2$ during the step of laminating,
wherein the material in said film roll consists of said carrier film provided as a mono-film and said polymer powder, which acts as a spacer in the storage of said film roll, and
wherein the powder consists of a polyethylene or ethylene vinyl acetate having a melt temperature which is less than the glue temperature of the hot melt glue applied to the carrier film, so that the powder melts and mixes into the hot melt glue during the step of laminating.

8. A method according to claim 7, wherein a ratio of weight per area unit of the hot melt glue and the powder is at least 7:1.

9. In a process for the production of an elastic laminate material web, comprising the following steps:
processing a carrier film made of a thermoplastic elastomer from a film roll;
laminating a cover material on at least one side of the carrier film using a hot melt glue which is applied to the carrier film at a glue temperature;
wherein the carrier film is a mono-film produced by extrusion from a polymer selected from the group consisting of styrene-isoprene-styrene block copolymer, styrene-butadiene-styrene block copolymer, styrene ethylene/butylene block copolymer, polyurethanes and ethylene copolymers,
wherein the improvement comprises:
applying a polymer powder directly to a surface of the carrier film on at least one side of the carrier film prior to the carrier film being rolled to prevent the carrier film from sticking to itself in the film roll,
wherein the material in said film roll consists of said carrier film provided as a mono-film and said polymer powder, which acts as a spacer in the storage of said film roll, and
wherein the powder consists of a polyethylene or ethylene vinyl acetate having a melt temperature which is less than the glue temperature of the hot melt glue applied to the carrier film, so that the powder melts and mixes into the hot melt glue during the step of laminating.

10. A method according to claim 9, wherein a ratio of weight per area unit of the hot melt glue and the powder is at least 7:1.

* * * * *